(12) United States Patent
Kodama et al.

(10) Patent No.: US 10,252,750 B2
(45) Date of Patent: Apr. 9, 2019

(54) VEHICULAR FRAME

(71) Applicant: MAZDA MOTOR CORPORATION, Hiroshima (JP)

(72) Inventors: Yuki Kodama, Aki-gun (JP); Masanori Honda, Hiroshima (JP); Chikara Kawamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 127 days.

(21) Appl. No.: 15/535,922

(22) PCT Filed: Dec. 14, 2015

(86) PCT No.: PCT/JP2015/084950
§ 371 (c)(1),
(2) Date: Jun. 14, 2017

(87) PCT Pub. No.: WO2016/098731
PCT Pub. Date: Jun. 23, 2016

(65) Prior Publication Data
US 2018/0362087 A1 Dec. 20, 2018

(30) Foreign Application Priority Data
Dec. 17, 2014 (JP) .................. 2014-254956

(51) Int. Cl.
*B60J 7/00* (2006.01)
*B62D 21/15* (2006.01)
*B62D 21/02* (2006.01)

(52) U.S. Cl.
CPC ........... *B62D 21/152* (2013.01); *B62D 21/02* (2013.01)

(58) Field of Classification Search
CPC ........... B65D 2571/00141; B65D 2571/00388; B65D 2571/00487; B65D 2571/00524;
(Continued)

(56) References Cited

U.S. PATENT DOCUMENTS 7,341,299 B1 * 3/2008 Baccouche .......... B62D 21/152
296/203.02
8,696,051 B2 * 4/2014 Charbonneau ....... B62D 21/157
296/187.12
(Continued)

FOREIGN PATENT DOCUMENTS

JP H06-37006 U 5/1994
JP 2003-327168 A 11/2003
(Continued)

OTHER PUBLICATIONS

International Search Report issued in PCT/JP2015/084950; dated Jan. 26, 2016.

*Primary Examiner* — Kiran B Patel
(74) *Attorney, Agent, or Firm* — Studebaker & Brackett PC

(57) ABSTRACT

Provided is a front side frame 2, comprising: a main frame 201; and reinforcing members 30, 40, 50 disposed inside the main frame 2, wherein the reinforcing member 30 includes partition wall portions 31*b*, 32*d*, 32*e* dividing a main closed cross-section C_m of the main frame 201 into a plurality of sub closed-cross sections c, the first to third partition wall portions 31*b*, 32*d*, 32*e* being respectively formed with compression-side ridges 31*s*, 32*s*, 32*u* vertically facing each other and able to come into contact with each other in a deformation of the front side frame 2, and tension-side ridges 31*t*, 32*t*, 32*v* arranged in the same manner.

13 Claims, 16 Drawing Sheets

(58) Field of Classification Search
CPC ........ B65D 2571/0066; B29C 45/1704; H01L 21/67326; H01L 21/67383; H01L 2924/0002; A47C 1/124
USPC .................................................. 296/187.09
See application file for complete search history.

(56) References Cited

U.S. PATENT DOCUMENTS

| | | | | |
|---|---|---|---|---|
| 8,807,597 B2* | 8/2014 | Akaki | ................... | B62D 21/02 |
| | | | | 180/232 |
| 9,242,655 B2* | 1/2016 | Taguchi | ................ | B61D 15/06 |
| 9,242,676 B2* | 1/2016 | Park | .................... | B62D 25/082 |
| 9,828,032 B2* | 11/2017 | Watanabe | ............ | B62D 21/152 |
| 9,855,970 B2* | 1/2018 | Kitakata | ............... | B62D 21/152 |
| 9,855,971 B2* | 1/2018 | Daido | .................... | B60R 19/02 |
| 2004/0113464 A1* | 6/2004 | Kasuga | ................ | B62D 21/152 |
| | | | | 296/205 |
| 2007/0215402 A1* | 9/2007 | Sasaki | ................. | B62D 21/152 |
| | | | | 180/232 |
| 2008/0067838 A1* | 3/2008 | Nakamae | ............. | B62D 21/152 |
| | | | | 296/203.02 |
| 2009/0066116 A1* | 3/2009 | Kuroita | ................ | B62D 25/081 |
| | | | | 296/193.09 |
| 2012/0119546 A1* | 5/2012 | Honda | ................. | B62D 25/025 |
| | | | | 296/203.01 |
| 2012/0169023 A1* | 7/2012 | Rawlinson | ........... | B60G 15/067 |
| | | | | 280/124.155 |
| 2015/0069785 A1* | 3/2015 | Sakakibara | .......... | B62D 25/085 |
| | | | | 296/187.1 |
| 2015/0115654 A1* | 4/2015 | Honda | ................. | B62D 29/002 |
| | | | | 296/187.12 |
| 2016/0251035 A1* | 9/2016 | Kodama | ............. | B62D 21/152 |
| | | | | 296/187.12 |
| 2017/0292169 A1* | 10/2017 | Cazes | ................. | C21D 9/0068 |
| 2018/0072347 A1* | 3/2018 | Kamei | ................ | B62D 25/082 |
| 2018/0257589 A1* | 9/2018 | Kawamura | ........... | B60R 19/34 |
| 2018/0334191 A1* | 11/2018 | Legray | ................ | B62D 21/152 |

FOREIGN PATENT DOCUMENTS

| | | |
|---|---|---|
| JP | 2004-188998 A | 7/2004 |
| JP | 2009-154672 A | 7/2009 |
| JP | 5104272 B2 | 12/2012 |

* cited by examiner

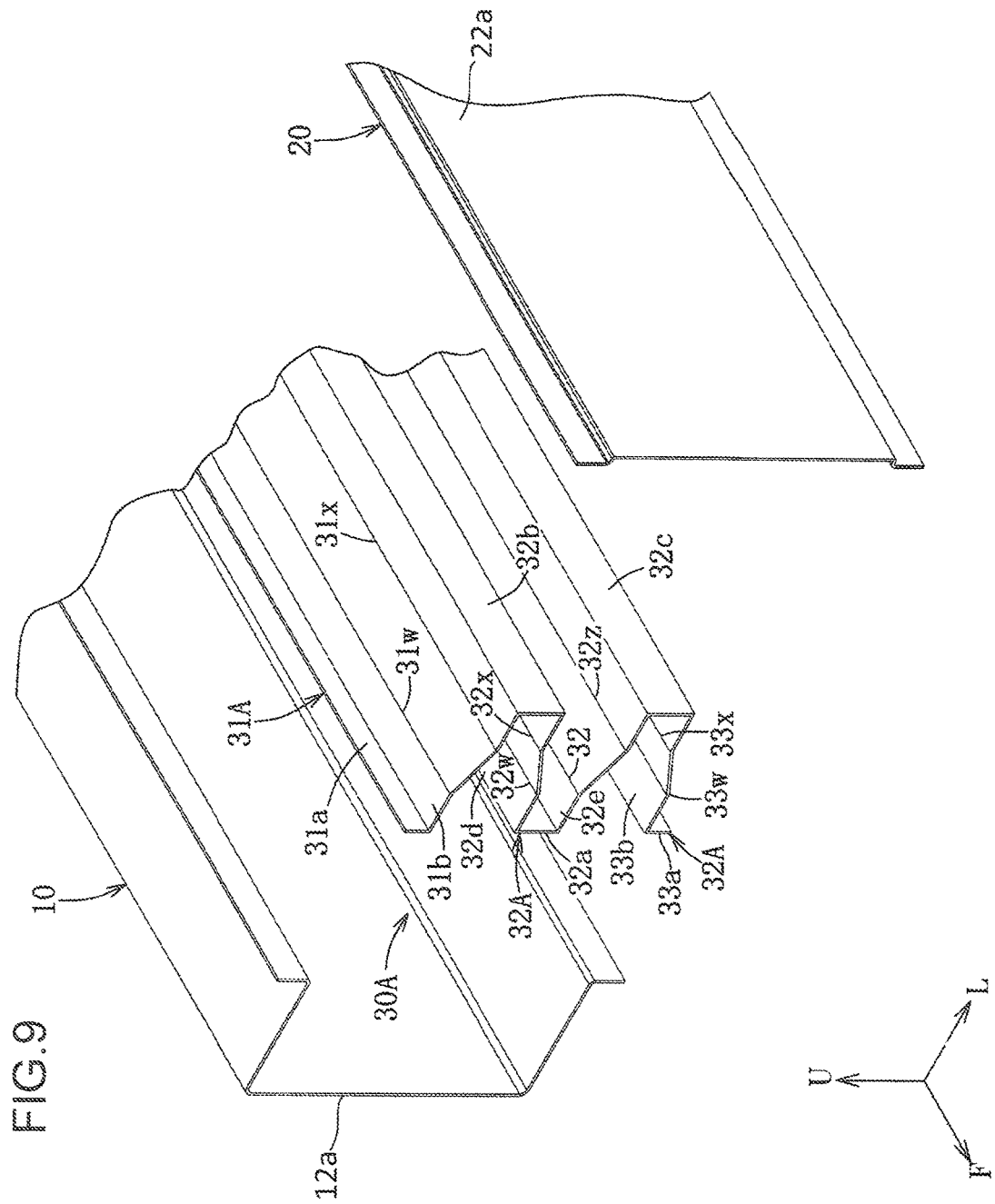

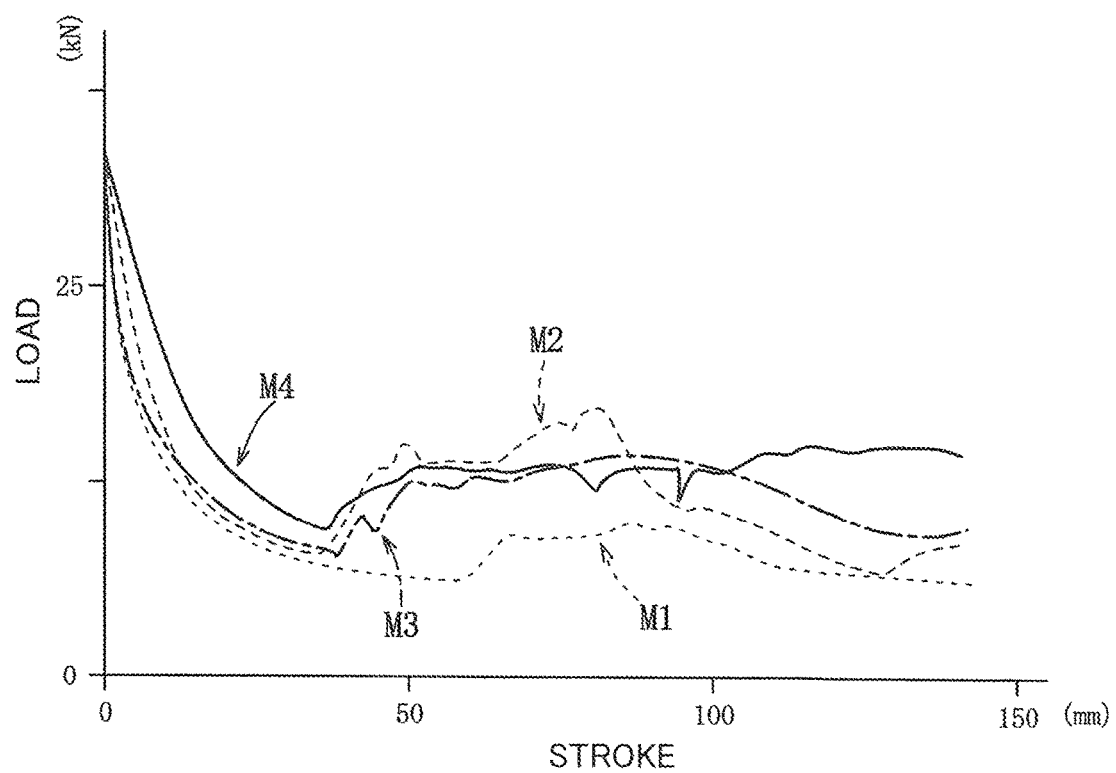

VEHICULAR FRAME

TECHNICAL FIELD

The present invention relates to a vehicular frame disposed in a front portion of a vehicle and extending in a front-rear direction.

BACKGROUND ART

Conventional vehicles such as one disclosed in Patent Literature 1 has adopted a structure for protecting an occupant in a front impact of the vehicle, the structure including an axially compressively deformable crash can disposed at a front end of a front side frame made of a high tensile strength steel, and allowing the front side frame to actively deform to bend from an intermediate portion to a rear end thereof.

In such a structure, most of an impact load is absorbed by the bending deformation of the front side frame. Therefore, the energy absorption characteristic of the bending deformation has a greater influence on EA (Energy Absorption) efficiency, i.e. the energy absorption amount per unit mass, than the energy absorption characteristic of the compressive deformation.

Here, it is necessary to further improve the EA efficiency in order to expand design options of a vehicle body and reduce the weight of the vehicle body.

CITATION LIST

Patent Literature

Patent Literature 1: Japanese Patent Publication No. 5104272

SUMMARY OF INVENTION

The present invention has an object of providing a vehicular frame capable of improving EA efficiency.

In order to achieve the above-mentioned object, the present invention comprises: a main frame disposed in a front portion of a vehicle and extending in a front-rear direction; and a reinforcing member disposed inside the main frame and extending in the front-rear direction, the reinforcing member defining a plurality of closed cross sections in the main frame by dividing an internal space of the main frame in a vertical direction, wherein: the main frame has a main closed cross section having a substantially rectangular shape and includes, in sectional view, a compression-side wall portion extending in the vertical direction and configured to receive a compressive load in an impact of the vehicle, a tension-side wall portion extending in the vertical direction and facing the compression-side wall portion in a width direction of the vehicle, and configured to receive a tensile load in the impact of the vehicle, a top wall portion linking an upper end of the compression-side wall portion and an upper end of the tension-side wall portion, and a bottom wall portion linking a lower end of the compression-side wall portion and a lower end of the tension-side wall portion; the reinforcing member includes a first compression-side connection portion connected to the compression-side wall portion, a second compression-side connection portion disposed below the first compression-side connection portion and connected to the compression-side wall portion, a first tension-side connection portion disposed below the first compression-side connection portion and above the second compression-side connection portion and connected to the tension-side wall portion, a second tension-side connection portion disposed below the second compression-side connection portion and connected to the tension-side wall portion, a first partition wall portion linking a lower end of the first compression-side connection portion and an upper end of the first tension-side connection portion, a second partition wall portion linking a lower end of the first tension-side connection portion and an upper end of the second compression-side connection portion, and a third partition wall portion linking a lower end of the second compression-side connection portion and an upper end of the second tension-side connection portion; each of the first to third partition wall portions is bended at a plurality of positions between the compression-side wall portion and the tension-side wall portion, and has a compression-side ridge extending in the front-rear direction and a tension-side ridge disposed between the compression-side ridge and the tension-side wall portion and extending in the front-rear direction, the respective compression-side ridges of the first to third partition wall portions facing each other in the vertical direction and the respective tension-side ridges of the first to third partition wall portions facing each other in the vertical direction; and the compression-side ridges and the tension-side ridges are disposed at positions that allow, in a deformation of the partition wall portions, the compression-side ridge of the second partition wall portion to come into contact with the compression-side ridge of the third partition wall portion or the tension-side ridge of the first partition wall portion to come into contact with the tension-side ridge of the second partition wall portion.

In this vehicular frame, each of the partition wall portions has a compression-side ridge and a tension-side ridge. Owing to these ridges, the partition wall portions is strengthened, which makes it possible to suppress a deformation of the partition wall portions and increase the allowable critical load of the vehicular frame.

Further, because a truss structure is formed in the main frame after a buckling of the compression-side wall portion, it is possible to prevent collapse of the cross section of the main frame and a load drop after the buckling. Consequently, the EA efficiency can be improved.

BRIEF DESCRIPTION OF DRAWINGS

FIG. 9 is a perspective view of an essential part of the modified reinforcing member.

FIG. 11 is a graph showing respective F-S characteristics of the frame models.

DESCRIPTION OF EMBODIMENTS

Figure 1:
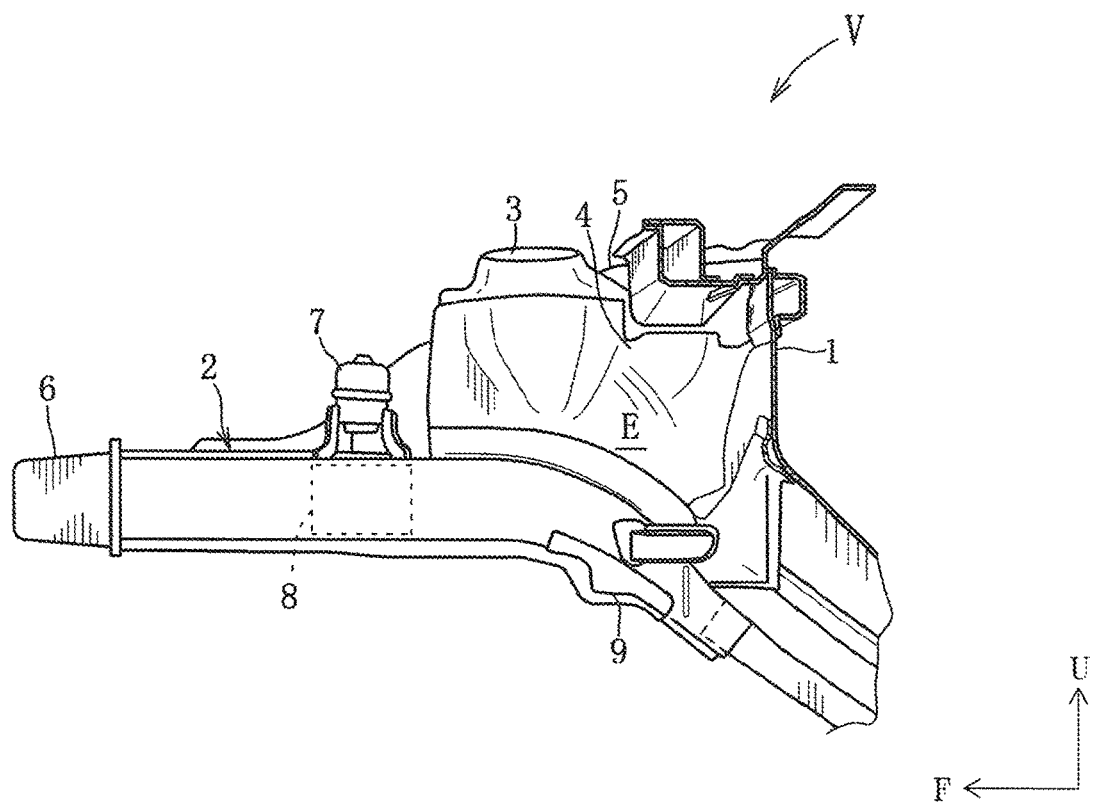
FIG. 1 is a side view of a front side frame according to a first embodiment, as seen from the inside of an engine room.

Hereinafter, an embodiment of the present invention will be described in detail with reference to the accompanying drawings.

The following description illustrates an example of application of the present invention to a front side frame of a vehicle, and is not intended to limit the scope, application, and usage of the present invention.

It should be noted that in the drawings, "F" denotes the front side (the front side of a vehicle in a front-rear direction), "L" denotes the left side (the left side as seen from a driver's seat), and "U" denotes the top side. In addition, hereinafter, the width direction of the vehicle will be also referred to as "left-right direction".

First Embodiment

Hereinafter, a first embodiment of the present invention will be described with reference to FIGS. 1 to 7.

First, a vehicle body structure of a front portion of a vehicle in which front side frames are installed will be described briefly.

As shown in FIG. 1, a vehicle V includes: a dash panel 1 extending in a vertical direction and in a vehicle width direction and partitioning an engine room E from a vehicle compartment; front side frames 2 disposed in front of the dash panel 1 and extending in a front-rear direction of the vehicle; suspension towers 3 each disposed laterally adjacent to the front side frame 2 and standing in the form of a tower; an apron 4 extending in the vertical direction and in the vehicle front-rear direction, and connecting the suspension towers 3 and the dash panel 1; an apron reinforcing member 5 disposed on an upper end of the apron 4 and extending in the vehicle front-rear direction; and other components. Because a portion around the front side frames 2 has a horizontally symmetrical structure, a right front side frame 2 will be mainly described, and description of a left front side frame 2 will be omitted.

A crash can 6 is disposed on a front end of the front side frame 2, the crash can 6 being configured to compressively deform (axially compress) to absorb part of an impact energy upon receipt of a front impact load.

An engine mount 7 substantially in the form of a cylinder is disposed in a central portion of the front side frame 2 in the front-rear direction. The engine mount 7 elastically supports a power unit (not shown). In addition, a mount attachment reinforcing member 8 is disposed in a portion inside the front side frame 2 that lies below the engine mount 7, the mount attachment reinforcing member 8 being provided for increasing the attachment rigidity of the engine mount 7. A sub-frame attaching bracket 9 is securely connected to a lower surface of a rear portion of the front side frame 2, the sub-frame attaching bracket 9 being provided for attaching a suspension sub-frame (not shown).

Now, the front side frame 2 will be described in detail.

The front side frame 2 is made of an aluminum alloy material (5000 series).

Figure 2:
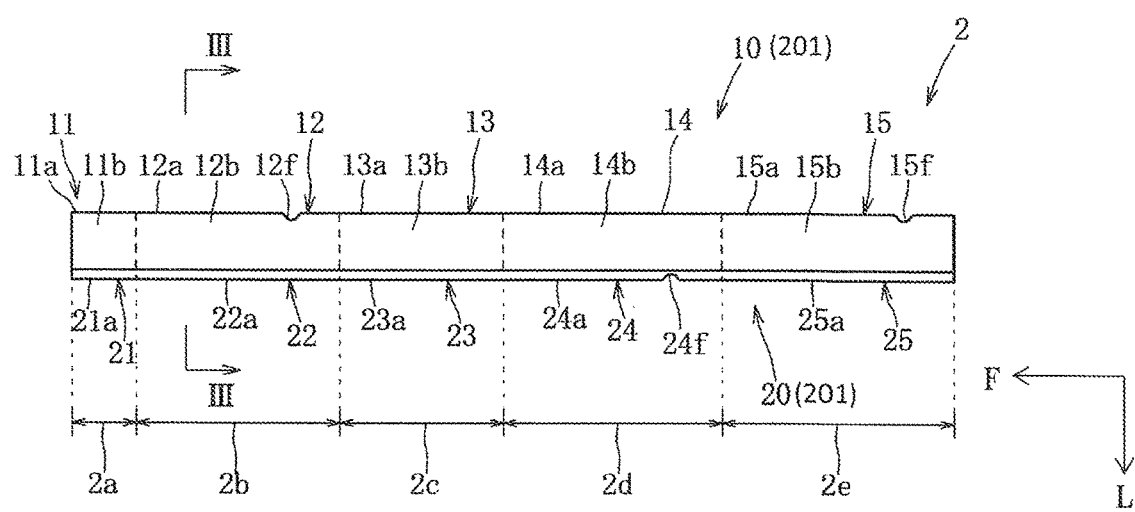
FIG. 2 is a plan view of a right front side frame.
Figure 3:
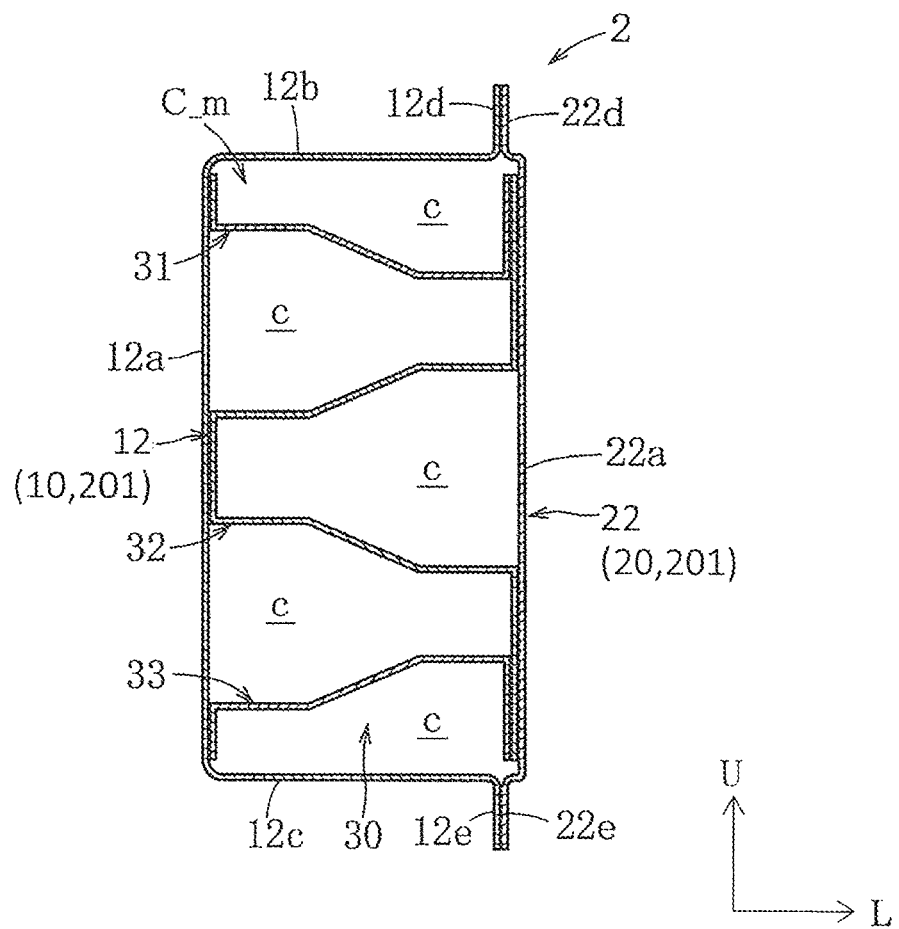
FIG. 3 is a sectional view taken along the line of FIG. 2.
Figure 4:
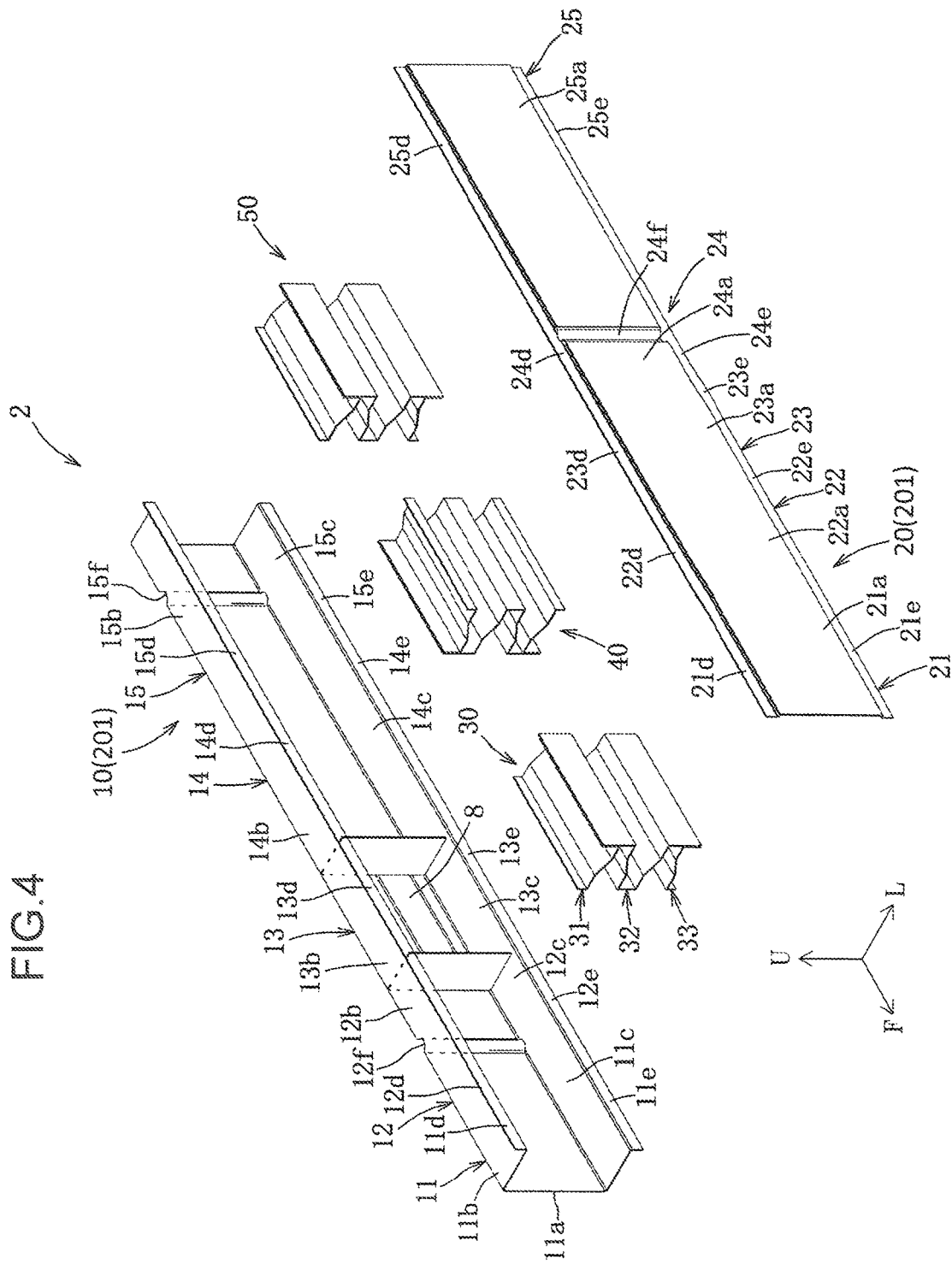
FIG. 4 is an exploded perspective view of the right front side frame.

As shown in FIGS. 2 to 4, the front side frame 2 comprises a main frame 201 including an outer member 10 having substantially the shape of a hat in cross section and an inner member 20 separate from the outer member 10 and having substantially the shape of a panel, and a plurality of reinforcing members 30, 40, 50 disposed inside the main frame 201.

The main frame 201 extends in the front-rear direction. A cross section of the main frame 201 that perpendicularly intersects the front-rear direction is a closed cross section having a substantially rectangular shape. Hereinafter, this closed cross section of the main frame 201 will be referred to as "main closed-cross section C_m".

The main closed-cross section C_m has a substantially rectangular shape having a longer dimension in the vertical direction (having a vertical dimension greater than a horizontal dimension).

The front side frame 2 includes the following zones defined by function in the front-rear direction: a front end zone 2a; an outward bending zone 2b joining the rear of the front end zone 2a and having the reinforcing member 30; a mount zone 2c joining the rear of the outward bending zone 2b and having the mount attachment reinforcing member 8; an inward bending zone 2d joining the rear of the mount zone 2c and having the reinforcing member 40, and an outward bending zone 2e joining the inward bending zone and having the reinforcing member 50.

As described, the reinforcing members 30, 40, 50 are respectively disposed in the outward bending zones 2b, 2e, and the inward bending zone 2d. Therefore, the vehicular frame according to the present invention is applied to each of the outward bending zones 2b, 2e, and the inward bending zone 2d that respectively include the reinforcing members 30, 40, 50.

The front end zone 2a, when a front impact occurs, axially compressively deforms to absorb part of an impact load not absorbed by the crash can 6.

In the front impact, the outward bending zone 2b deforms to bend in a vehicle width outward direction with a first bead part 12f shifting in a vehicle width inward direction, the first bead part 12f being formed in an intermediate part of the outward bending zone 2b and extending in the vertical direction.

The mount attachment reinforcing member 8 is disposed at an inner side of the mount zone 2c.

In the front impact, the inward bending zone 2d deforms to bend in the vehicle with inward direction with a second bead part 24f shifting in the vehicle width outward direction, the second bead part 24f formed in an intermediate part of the inward bending zone 2d and extending in the vertical direction. A rear end of the inward bending zone 2d supports the sub-frame attaching bracket 9.

Further, in the front impact, the outward bending zone 2e deforms to bend outwardly with a third bead part 15f shifting in the vehicle width inward direction, the third bead part 15f being formed in an intermediate part of the outward bending zone 2e and extending in the vertical direction. A rear end of the outward bending zone 2e is adhered to the dash panel 1.

The outer member 10 will be described.

The outer member 10 includes a first outer section 11 constituting the right side of the front end zone 2a, a second outer section 12 constituting the right side of the outward bending zone 2b, a third outer section 13 constituting the right side of the mount zone 2c, a fourth outer section 14 constituting the right side of the inward bending zone 2d, and a fifth outer section 15 constituting the right side of the outward bending zone 2e, the first to fifth outer sections 12 to 15 being formed in one body.

<First Outer Section>

The first outer section 11 includes a right wall portion 11a extending along a plane substantially perpendicularly intersecting the left-right direction (extending in the vertical and front-rear directions), an upper end wall portion 11b extending leftward from an upper end of the right wall portion 11a, and a lower end wall portion 11c extending leftward from a lower end of the right wall portion 11a, the wall portions 11a to 11c being formed in one body.

The upper end wall portion 11b and the lower end wall portion 11c include an upper flange part 11d and a lower flange part 11e, respectively. The upper flange part 11d extends upwardly at a left end of the upper end wall portion 11b. The lower flange portion 11e extends downwardly at a left end of the lower end wall portion 11c.

<Second Outer Section>

Now, the second outer section 12 will be described.

The second outer section 12 includes a compression-side wall portion 12a extending along a plane substantially perpendicularly intersecting the left-right direction (extending in the vertical and front-rear directions), an upper end wall portion (top wall portion) 12b extending leftward from an upper end of the compression-side wall portion 12a, and a lower end wall portion (bottom wall portion) 12c extending leftward from a lower end of the compression-side wall portion 12a, the wall portions 12a to 12c being formed in one body.

The compression-side wall portion 12a includes the first bead part 12f projecting into the inside of the main closed-cross section C_m. The first bead part 12f extends in a direction substantially perpendicularly intersecting the front-rear direction over the entirety of the compression-side wall portion 12a in the vertical direction.

The upper end wall portion 12b includes an upper flange part 12d extending upward at a left end thereof and the lower end wall portion 12c includes a lower flange part 12e extending downward at a left end thereof.

<Third Outer Section>

The third outer section 13 has substantially the same configuration as the first outer section 11, and includes a right wall portion 13a, an upper end wall portion 13b, a lower end wall portion 13c, an upper flange part 13d, and a lower flange part 13e.

<Fourth Outer Section>

The fourth outer section 14 has substantially the same configuration as the first outer section 11, and includes a tension-side wall portion 14a, an upper end wall portion (top wall portion) 14b, a lower end wall portion (bottom wall portion) 14c, an upper flange part 14d, and a lower flange part 14e.

<Fifth Outer Section>

The fifth outer section 15 has substantially the same configuration as the second outer section 12, and includes a compression-side wall portion 15a, an upper end wall portion (top wall portion) 15b, a lower end wall portion (bottom wall portion) 15c, an upper flange part 15d, a lower flange part 15e, and the third bead part 15f similarly to the second outer section 12.

Now, the inner member 20 will be described.

As shown in FIGS. 2 to 4, the inner member 20 includes a first inner section 21 constituting the left side of the front end zone 2a, a second inner section 22 constituting the left side of the outward bending zone 2b, a third inner section 23 constituting the left side of the mount zone 2c, a fourth inner section 24 constituting the left side of the inward bending zone 2d, and a fifth inner section 25 constituting the left side of the outward bending zone 2e, the first to fifth inner sections 21 to 25 being formed in one body.

<First Inner Section>

The first inner section 21 includes a left wall portion 21a extending along a plane substantially perpendicularly intersecting the left-right direction (extending in the vertical and front-rear directions), an upper flange portion 21d extending upward from an upper end of the left wall portion 21a, and a lower flange portion 21e extending downward from a lower end of the left wall portion 21a, the portions 21a to 21e being formed in one body.

<Second Inner Section>

The second inner section 22 has substantially the same configuration as the first inner section 21. The second inner section 22 includes a tension-side wall portion 22a extending in the vertical and front-rear directions and facing the compression-side wall portion 12a of the second outer section 12 in the left-right direction, an upper flange portion 22d extending upward from an upper end of the tension-side wall portion 22a, and a lower flange portion 22e extending downward from a lower end of the tension-side wall portion 22a, the portions 22a to 22e being formed in one body.

<Third Inner Section>

The third inner section 23 has substantially the same configuration as the first inner section 21, and includes a left wall portion 23a, an upper flange portion 23d, and a lower flange portion 23e that are formed in one body.

<Fourth Inner Section>

The fourth inner section 24 includes a compression-side wall portion 24a extending along a plane substantially perpendicularly intersecting the left-right direction (extending in the vertical and front-rear directions) and facing the tension-side wall portion 14a of the fourth outer section 14 in the left-right direction, an upper flange portion 24d extending upward from an upper end of the compression-side wall portion 24a, and a lower flange portion 24e extending downward from a lower end of the compression-side wall portion 24a.

The compression-side wall portion 24a includes the second bead part 24f projecting into the inside of the main closed-cross section C_m. The second bead part 24f extends in a direction substantially perpendicularly intersecting the front-rear direction over the entirety of the compression-side wall portion 24a in the vertical direction.

<Fifth Inner Section>

The fifth inner section 25 has substantially the same configuration as the second inner section 22. The fifth inner section 25 includes a tension-side wall portion 25a extending in the vertical and front-rear directions and facing the tension-side wall portion 15a of the fifth outer section 15 in the left-right direction, an upper flange portion 25d, and a lower flange portion 25e, the portions 25a to 25e being formed in one body.

The upper flange parts 11d to 15d of the outer sections 11 to 15 are connected to the upper flange portions 21d to 25d of the inner sections 21 to 25, respectively, and the lower flange parts 11e to 15e of the outer sections 11 to 15 are connected to the lower flange portions 21e to 25e of the inner sections 21 to 25, respectively. Consequently, the main closed-cross section C_m extending in the front-rear direction is defined.

Now, the reinforcing member 30 disposed in the outward bending zone 2b will be described.

It should be noted that the reinforcing member 50 disposed in the outward bending zone 2e has the same configuration as the reinforcing member 30 with its structure being laterally symmetrical to the reinforcing member 40 disposed in the inward bending zone 2d. Therefore, only the reinforcing member 30 disposed in the outward bending zone 2b will be described, and detailed description of the reinforcing members 40, 50 will be omitted here.

As shown in FIG. 3, the reinforcing member 30 is disposed in the main closed-cross section C_m, and defines five sub closed-cross sections c in the main frame 201, i.e. in the main closed-cross section C_m, in cooperation with the main closed-cross section C_m, the sub closed-cross sections c being vertically adjacent to each other.

Figure 5:
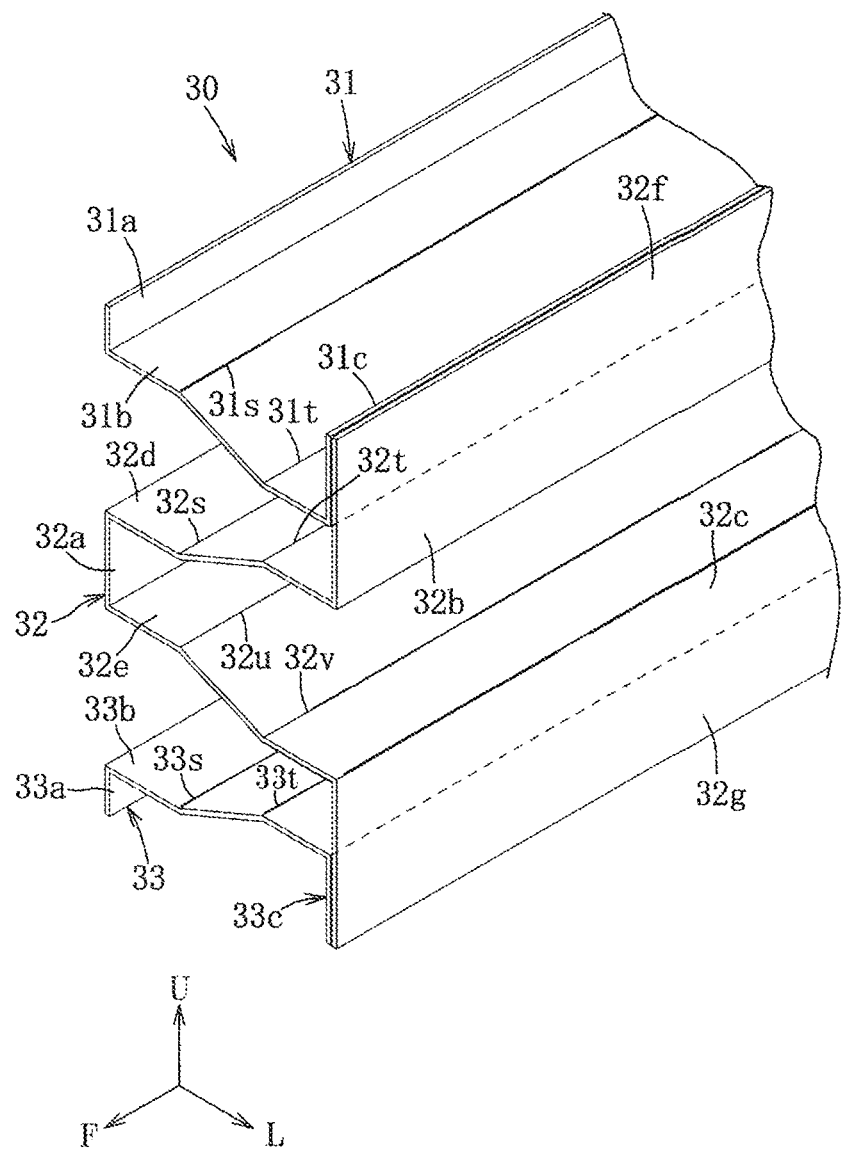
FIG. 5 is a perspective view showing an essential part of a reinforcing member.

As shown in FIGS. 3 to 5, the reinforcing member 30 includes an upper level section 31, a middle level section 32, and a lower level section 33 disposed in this order from above.

In the present embodiment, the upper level section 31, the middle level section 32, and the lower level section 33 are provided as separate components from each other.

As shown in FIG. 5, the upper level section 31 includes a first compression-side connection portion 31a extending along a plane substantially perpendicularly intersecting the left-right direction, a first partition wall portion 31b joining a lower end of the first compression-side connection portion 31a and dividing the main closed-cross section C_m in the vertical direction, and a partition wall flange portion 31c. These portions 31a to 31c are formed in one body.

The first compression-side connection portion 31a extends along the compression-side wall portion 12a and in the front-rear and the vertical directions. The first compression-side connection portion 31a is connected to a left surface of the compression side wall portion 12a by welding.

The first partition wall portion 31b extends leftward from a lower end of the first compression-side connection portion 31a. The first partition wall portion 31b links the lower end of the first compression-side connection portion 31a and an upper end of a first tension-side connection portion 32b described later.

The partition wall flange portion 31c extends upward from a left end of the first partition wall portion 31b.

The first partition wall portion 31b is bent at two positions in intermediate parts thereof in the left-right direction. In other words, the first partition wall portion 31b is bent at two positions between the compression-side wall portion 12a and the tension-side wall portion 22a. Consequently, the first partition wall portion 31b has a first compression-side ridge 31s lying at an intermediate part thereof in the left-right direction and extending in the front-rear direction, and a first tension-side ridge 31t lying on the left of the first compression-side ridge 31s and extending in the front-rear direction.

The first partition wall portion 31b includes a part extending substantially horizontally from the lower end of the first compression-side connection portion 31a to the first compression-side ridge 31s. The first partition wall portion 31b includes a part sloping downward as progressing leftward from the first compression-side ridge 31s to the first tension-side ridge 31t. In other words, a part of the first partition wall portion 31b that extends from the first compression-side ridge 31s to the first tension-side ridge 31t slopes downward to the left. The first partition wall portion 31b includes a part extending substantially horizontally from the first tension-side ridge 31t to a lower end of the partition wall flange portion 31c.

The first compression-side ridge 31s and the first tension-side ridge 31t are located at positions sandwiching the neutral axis under a load in front view.

The middle level section 32 includes a second compression-side connection portion 32a located below the first compression-side connection portion 31a, the first tension-side connection portion 32b joining the left end of the first partition wall portion 31b and extending along a plane substantially perpendicularly intersecting the left-right direction (extending in the vertical and front-rear directions), a second tension-side connection portion 32c located below the first tension-side connection portion 32b, a second partition wall portion 32d linking a lower end of the first tension-side connection portion 32b and an upper end of the second compression-side connection portion 32a and dividing the main closed-cross section C_m in the vertical direction, a third partition wall portion 32e linking a lower end of the second compression-side connection portion 32a and an upper end of the second tension-side connection portion 32c and dividing the main closed-cross section C_m in the vertical direction, and connection flange portions 32f, 32g. These portions 32a to 32g are formed in one body.

As shown in FIG. 5, the second compression-side connection portion 32a lies below the first tension-side connection portion 32b, and extends along the compression-side wall portion 12a and in the front-rear and vertical directions, the second compression-side connection portion 32a being connected to the left surface of the compression-side wall portion 12a by welding.

The first tension-side connection portion 32b is disposed below the first compression-side connection portion 31a and above the second compression-side connection portion 32a. The first tension-side connection portion 32b extends along the tension-side wall portion 22a and in the front-rear and vertical directions, the first tension-side connection portion 32b being connected to a right surface of the tension-side wall portion 22a by welding.

The connection flange portion 32f extends upward from an upper end of the first tension-side connection portion 32b. The connection flange portion 32f is connected to the partition wall flange portion 31c by welding.

The second tension-side connection portion 32c lies below the second compression-side connection portion 32a, and extends along the tension-side wall portion 22a and in the front-rear and vertical directions, the second tension-side connection portion 32c being connected to the right surface of the tension-side wall portion 22a by welding.

The connection flange portion 32g extends downward from a lower end of the second tension-side connection portion 32c.

The second partition wall portion 32d extends rightward from the lower end of the first tension-side connection portion 32b. The second partition wall portion 32d links the lower end of the first tension-side connection portion 32b and the upper end of the second compression-side connection portion 32a, and divides the main closed-cross section C_m in the vertical direction.

The connection flange portion 32f, i.e. one of the flange portions of the middle level section 32, extends upward from the upper end of the first tension-side connection portion 32b. The partition wall flange portion 31c of the upper level section 31 extends along a right surface of the connection flange portion 32f, and these flanges are connected to each other by welding.

The second partition wall portion 32d is bent at two positions in intermediate parts thereof in the left-right direction. In other words, the second partition wall portion 32d is bent at two positions between the compression-side wall portion 12a and the tension-side wall portion 22a. Consequently, the second partition wall portion 32d has a second compression-side ridge 32s lying at an intermediate part thereof in the left-right direction and extending in the front-rear direction, and a second tension-side ridge 32t lying on the left of the second compression-side ridge 32s and extending in the front-rear direction.

The second partition wall portion 32d includes a part extending substantially horizontally from the upper end of the second compression-side connection portion 32a to the second compression-side ridge 32s. The second partition wall portion 32d includes a part sloping upward as progressing leftward from the second compression-side ridge 32s to the second tension-side ridge 32t. In other words, a part of the second partition wall portion 32d that extends from the second compression-side ridge 32s to the second tension-side ridge 32t slopes upward to the left. The second partition wall portion 32d includes a part extending substantially horizontally from the second tension-side ridge 32t to the lower end of the first tension-side connection portion 32b.

The second compression-side ridge 32s lies directly under and faces the first compression-side ridge 31s, and extends in the front-rear direction. The second tension-side ridge 32t lies directly under and faces the first tension-side ridge 31t, and extends in the front-rear direction.

The first and second tension-side ridges 31t, 32t lie below the first compression-side ridge 31s and above the second compression-side ridge 32s, respectively. The vertical distance between the first and second tension-side ridges 31t, 32t is smaller than the vertical distance between the first and second compression-side ridges 31s, 32s.

The third partition wall portion 32e extends leftward from the lower end of the second compression-side connection portion 32a. The third partition wall portion 32e links the lower end of the second compression-side connection portion 32a and the upper end of the second tension-side connection portion 32c and divides the main closed-cross section C_m in the vertical direction.

The connection flange portion 32g, i.e. the other of the flange portions of the middle level section 32, extends downward from a left end of the third partition wall portion 32e.

As shown in FIG. 5, the third partition wall portion 32e is bent at two positions in intermediate parts thereof in the left-right direction. In other words, the third partition wall portion 32e is bent at two positions between the compression-side wall portion 12a and the tension-side wall portion 22a. Consequently, the third partition wall portion 32e has a third compression-side ridge 32u lying at an intermediate part thereof in the left-right direction and extending in the front-rear direction, and a third tension-side ridge 32v lying on the left of the third compression-side ridge 32u and extending in the front-rear direction.

The third partition wall portion 32e includes a part extending substantially horizontally from the lower end of the second compression-side connection portion 32a to the third compression-side ridge 32u. The third partition wall portion 32e includes a part sloping downward as progressing leftward from the third compression-side ridge 32u to the third tension-side ridge 32v. In other words, a part of the third partition wall portion 32e that extends from the third compression-side ridge 32u to the third tension-side ridge 32v slopes downward to the left. The third partition wall portion 32e includes a part extending substantially horizontally from the third tension-side ridge 32v to the upper end of the second tension-side connection portion 32c.

The third compression-side ridge 32u lies directly under and faces the second compression-side ridge 32s, and extends in the front-rear direction. The third tension-side ridge 32u lies directly under and faces the second tension-side ridge 32t, and extends in the front-rear direction.

The second and third compression-side ridges 32s, 32u lie below the second tension-side ridge 32t and above the third tension-side ridge 32v, respectively. The vertical distance between the second and third compression-side ridges 32s, 32u is smaller than the vertical distance between the second and third tension-side ridges 32t, 32v.

In the present embodiment, the vertical distance between the second compression-side ridge 32s and the third compression-side ridge 32u is greater than the vertical distance between the first tension-side ridge 31t and the second tension-side ridge 32t and the vertical distance between the third tension-side ridge 32v and a fourth tension-side ridge 33t.

The lower level section 33 includes a third compression-side connection portion 33a located below the second compression-side connection portion 32a, a fourth partition wall portion 33b joining an upper end of the third compression-side connection portion 33a and dividing the main closed-cross section C_m in the vertical direction, and a partition wall flange portion 33c. These portions 33a to 33c are formed in one body.

The third compression-side connection portion 33a lies below the second tension-side connection portion 32c, and extends along the compression-side wall portion 12a and in the front-rear and vertical directions, the third compression-side connection portion 33a being connected to the left surface of the compression-side wall portion 12a by welding.

The fourth partition wall portion 33b extends rightward from the upper end of the third compression-side connection portion 33a. The fourth partition wall portion 33b links the upper end of the third compression-side connection portion 33a and the lower end of the second tension-side connection portion 32c, and divides the main closed-cross section C_m in the vertical direction.

The fourth partition wall portion 33b is bent at two positions in intermediate parts thereof in the left-right direction. In other words, the fourth partition wall portion 33b is bent at two positions between the compression-side wall portion 12a and the tension-side wall portion 22a. Consequently, the fourth partition wall portion 33b has a fourth compression-side ridge 33s lying at an intermediate part thereof in the left-right direction and extending in the front-rear direction, and the fourth tension-side ridge 33t lying on the left of the fourth compression-side ridge 33s and extending in the front-rear direction.

The fourth partition wall portion 33b includes a part extending substantially horizontally from the upper end of the third compression-side connection portion 33a to the fourth compression-side ridge 33s. The fourth partition wall portion 33b includes a part sloping upward as progressing leftward from the fourth compression-side ridge 33s to the fourth tension-side ridge 33t. In other words, a part of the fourth partition wall portion 33b that extends from the fourth compression-side ridge 33s to the fourth tension-side ridge 33t slopes upward to the left. The fourth partition wall portion 33b includes a part extending substantially horizontally from the fourth tension-side ridge 33t to an upper end of the partition flange portion 33c.

The partition wall flange portion 33c of the lower level section 33 extends downward from a left end of the fourth partition wall portion 33b. The partition wall flange portion 33c extends along a right surface of the connection flange portion 32g constituting the lower portion of the middle level section 32, the partition wall flange portion 33c and the connection flange portion 32g being connected to each other by welding.

The fourth compression-side ridge 33s lies directly under and faces the third compression-side ridge 32u, and extends in the front-rear direction. The fourth tension-side ridge 33t lies directly under and faces the third tension-side ridge 32v, and extends in the front-rear direction.

The third and fourth tension-side ridges 32v, 33t lie under the third compression-side ridge 32u and above the fourth compression-side ridge 33s, respectively.

The vertical distance between the third and fourth ridges 32v, 33t is smaller than the vertical distance between the third and fourth compression-side ridges 32u, 33s.

As described above, in the present embodiment, the main closed-cross section C_m is divided into the five sub closed-cross sections c in the vertical direction by the partition wall portions 31b, 32d, 32e, 33b.

Here, in the present embodiment, each sub closed-cross section c has a vertical dimension or a height that is smaller than a lateral dimension or a width. Thus, the length-to-width ratio of each sub closed-cross section is 1 or less.

Figure 6:
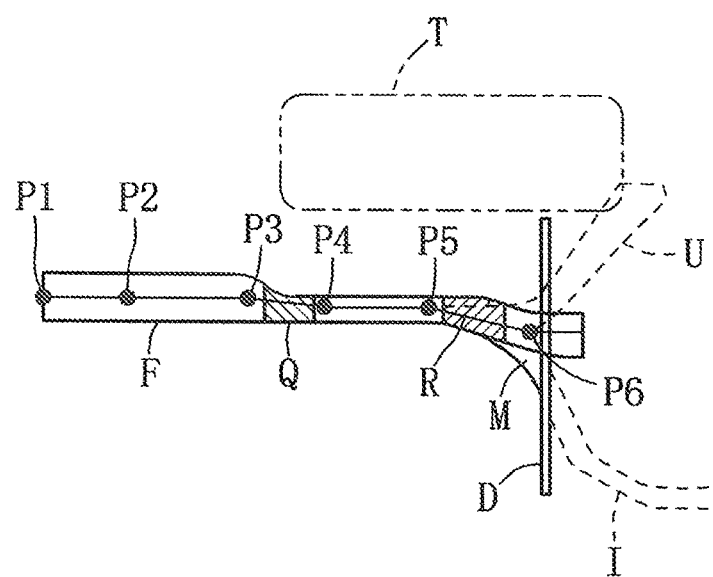
FIG. 6 is a schematic view showing a state of the front side frame before receipt of a front impact load.
Figure 7:
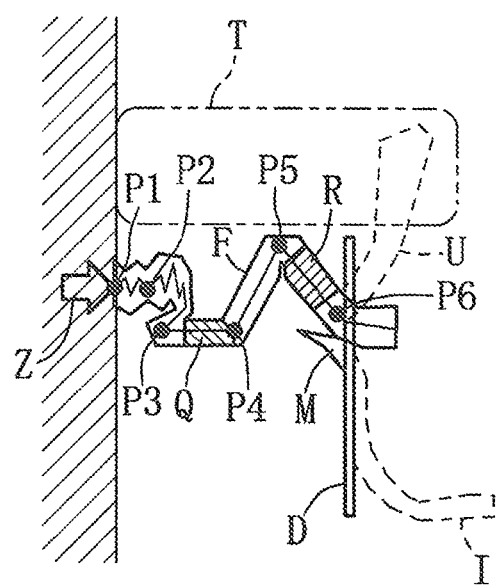
FIG. 7 is a schematic view showing a state of the front side frame after the receipt of the front impact load.

Now, a deformation of the vehicle V upon receipt of a front impact load will be described with reference to FIGS. 6 and 7. FIGS. 6 and 7 are schematic top views of the periphery of the front side frame.

In the schematic view of FIG. 6, "F" denotes a front frame unit including the front side frame and the crash can, "D" denotes the dash panel, "M" denotes a linking reinforcing member, "I" denotes an inner load transmission unit including a dash lower cross member and a member provided in a tunnel section, "U" denotes an upper linking member, "Q" (a hatched region) denotes the mount attachment reinforcing member, "R" (a hatched region) denotes the sub-frame attaching bracket, and "T" denotes a front tire.

In addition, a plurality of points P1 to P5 are shown in the front frame unit F for sake of convenience so that their relative positions after a deformation can be easily seen.

The first point P1 denotes a front end position of the crash can 6, the second point P2 denotes a front end position of the front side frame 2, the third point P3 denotes a position where the first bead part 12f is formed, the fourth point P4 denotes a rear end position of the mount attachment reinforcing member 8, the fifth point P5 denotes a position where the second bead part 24f is formed, and the sixth point P6 denotes a position where the third bead part 15f is formed.

Upon receipt of a load Z, the front frame unit F actively causes a compressive deformation and a bending deformation in the vehicle width direction to thereby absorb an impact energy.

As shown in FIG. 7, when a collision object collides with the front frame unit F, an axially compressive deformation occurs in a portion of the front frame unit F that extends from the first point P1 to a position slightly behind the second point P2.

Because the first bead part 12f is formed near the third point P3, a bending deformation in the vehicle width outward direction (outward bending deformation) occurs in such a way that the third point P3 shifts in the vehicle width inward direction.

Specifically, in a region extending from the third point P3 to the fourth point P4, a deformation is hindered by the mount attachment reinforcing member Q and the like. Consequently, a portion between the second point P2 and the third point P3 deforms to bend in the vehicle width inward direction (inwardly bend) and a portion behind the third point P3 is deformed to bend in the vehicle width outward direction.

Because the second bead part 24f is formed near the fifth point P5, a bending deformation in the vehicle width inward direction (inward bending deformation) occurs in such a way that the fifth point P5 jumps out in the vehicle width outward direction.

In particular, the sub-frame attaching bracket R for attaching the sub-frame is disposed in a region behind the fifth point P5. In addition, the portion behind the fifth point P5 has a high frame rigidity in order to disperse a load at its rear position. This promotes the bending deformation in the vehicle width inward direction that occurs near the fifth point P5.

Because the third bead part 15f is formed near the sixth point P6, a bending deformation in the vehicle width outward direction occurs in such a way that the sixth point P6 shifts in the vehicle width inward direction.

As described above, the bending deformation in the vehicle width outward direction occurs at the third point P3 and the sixth point P6, and the bending deformation in the vehicle width inward direction occurs at the fifth point P5. This allows achievement of sufficiently high EA efficiency.

Now, a modification of the reinforcing member 30 will be described with reference to FIGS. 8 and 9.

Elements that have configurations identical to those of the first embodiment are denoted by the same reference numerals as in the first embodiment.

Figure 8:
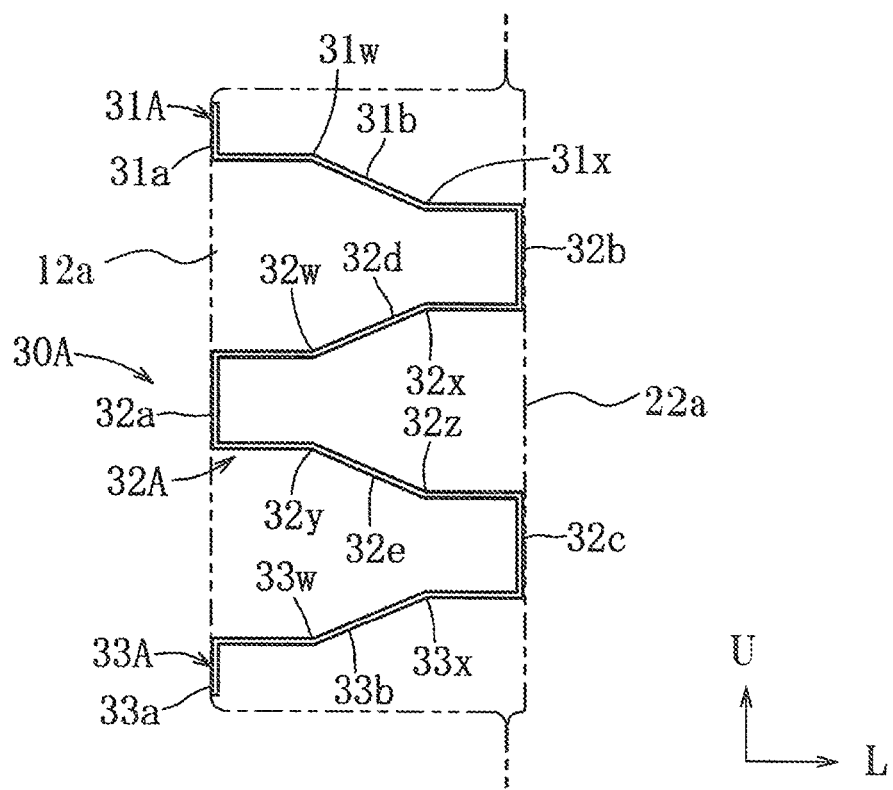
FIG. 8 is a front view of a modified reinforcing member.
Figure 10A:
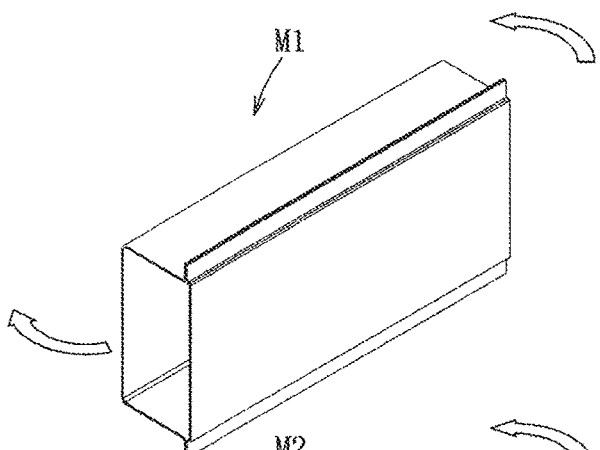
FIG. 10 show perspective views of frame models for analysis, FIG. 10A showing a frame model M1 according to a prior art, FIG. 10B showing a frame model M2 according to a prior art, FIG. 10C showing a frame model M3 according to the modification, and FIG. 10D showing a frame model M4 according to the first embodiment.
Figure 10B:
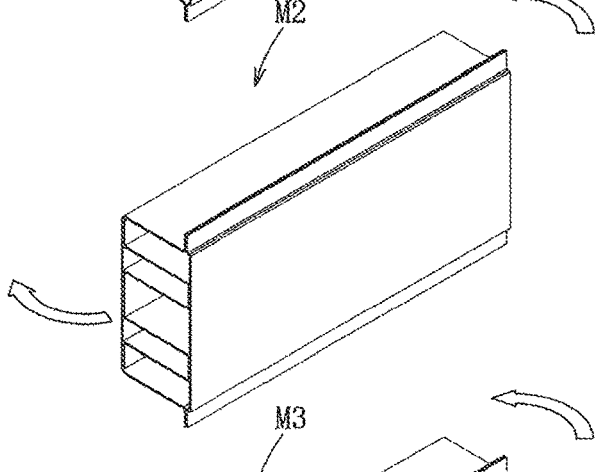
Figure 10C:
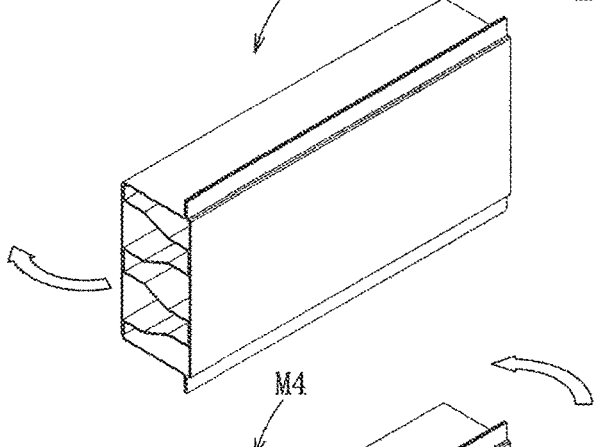
Figure 10D:
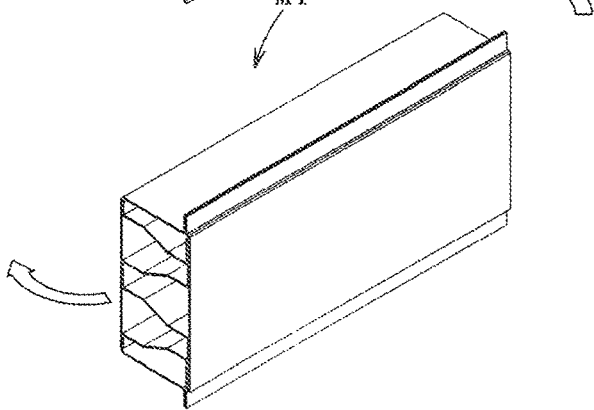

As shown in FIGS. 8 and 9, a reinforcing member 30A is formed by pressing a single steel plate in such a way as to include an upper level section 31A, a middle level section 32A, and a lower level section 33A in one body.

In the upper level section 31A, a first compression-side connection portion 31a, a first partition wall portion 31b, a first compression-side ridge 31w, and a first tension-side ridge 31x are formed.

In the lower level section 33A, a third compression-side connection portion 33a, a fourth partition wall portion 33b, a fourth compression-side ridge 33w, and a fourth tension-side ridge 33x are formed.

In the middle level section 32A, a second compression-side connection portion 32a, a first tension-side connection portion 32b, a second tension-side connection portion 32c, a second partition wall portion 32d, and a third partition wall portion 32e are formed.

The second partition wall portion 32d is formed with a second compression-side ridge 32w and a second tension-side ridge 32x, and the third partition wall portion 32 is formed with a third compression-side ridge 32y and a third tension-side ridge 32z.

In this modification, all of the vertical distance between the first tension-side ridge 31x and the second tension-side ridge 32x, the vertical distance between the second compression-side ridge 32w and the third compression-side ridge 32y, and the vertical distance between the third tension-side ridge 32z and the fourth tension-side ridge 33x are equal to each other.

It should be noted that the first compression-side ridge 31w, the second compression-side ridge 32w, the third compression-side ridge 32y, and the fourth compression-side ridge 33w face each other in the vertical direction, and that the first tension-side ridge 31x, the second tension-side ridge 32x, the third tension-side ridge 32z, and the fourth tension-side ridge 33x face each other in the vertical direction.

Now, the functions and effects of the vehicular frame according to the present embodiment will be described.

First, FIGS. 10A to 10D show frame models M1 to M4 prepared to analyze the correlation (FS characteristic) between the supportable load and the deformation stroke of each of the frame models M1 to M4 using a CAE (Computer Aided Engineering).

The frame model M1 (see FIG. 10A) consists only of a main frame having a rectangular shape in cross section, and has no reinforcing member.

The frame model M2 (see FIG. 10B) includes a main frame and a reinforcing member disposed in the main frame, the reinforcing member having a different structure from that of the present invention. Specifically, the reinforcing member includes a plurality of walls each horizontally extending from one side wall to the other side wall of the main frame in a width direction of the main frame. These walls are arranged in a vertical direction and dividing a main closed cross-section of the main frame into a plurality of sub closed-cross sections in the vertical direction. Further, all of these walls are formed in one body together with portions connected to the side walls of the main frame.

The frame model M3 (see FIG. 10C) includes the reinforcing member 30A of the modification.

The frame model M4 (see FIG. 10D) includes the reinforcing member 30 of the first embodiment.

Figure 14:
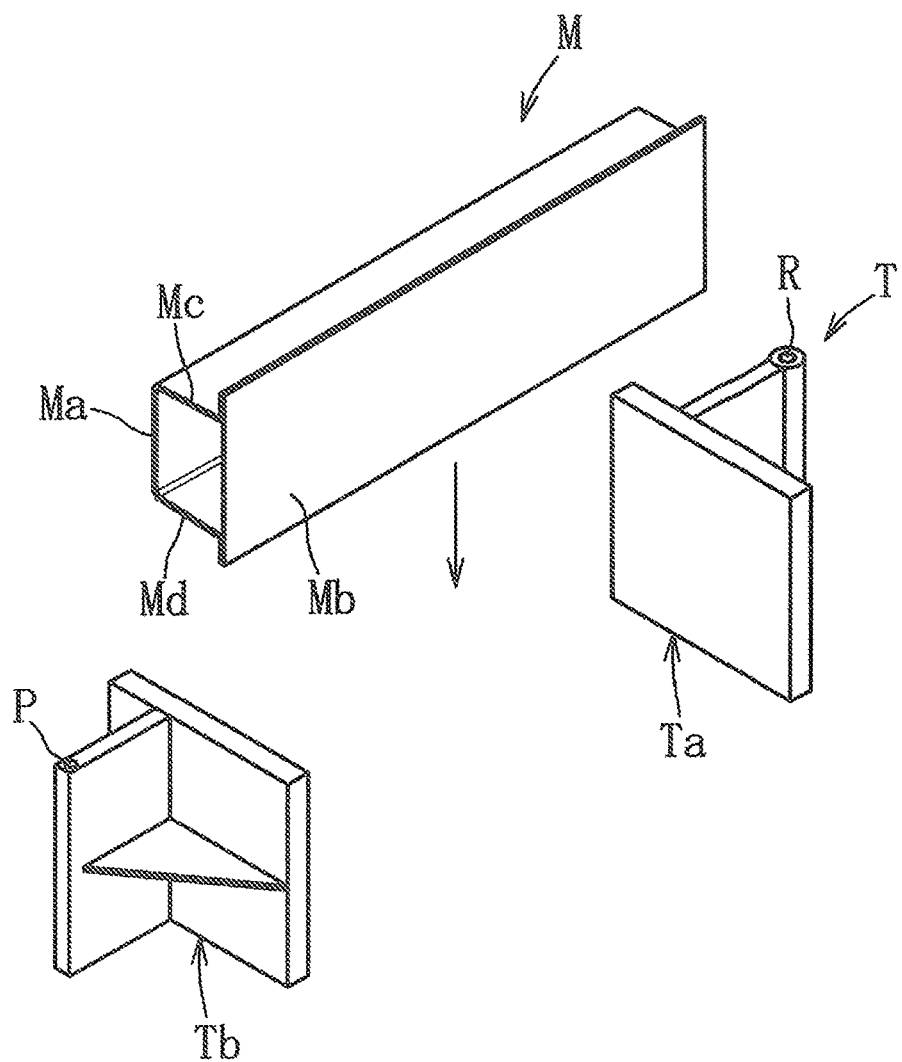
FIG. 14 is a diagram for explaining an analysis method of a deformation of a frame having a closed cross-section.

A load was applied to each of the frame models M1 to M4 in a direction to bend the respective axis to analyze a displacement of a load point and a reaction force at the load point, the application of the load being performed in a state that opposite ends of the frame models M1 to M4 are clamped (see FIGS. 14 and 15).

FIG. 11 shows an analysis result provided by the CAE. In the graph of F-S characteristics of FIG. 11, the vertical axis represents the load (kN) and the horizontal axis represents the stroke (mm).

As shown in FIG. 11, the frame model M1 having no reinforcing member was buckled by an allowable critical load lower than those of the frame models M2 to M4, and a load drop immediately after the buckling was significant. Thus, the frame model M1 was found to have the lowest EA efficiency.

As for the frame model M2, the decreasing rate of the load immediately after the buckling was great, and a second load drop occurred soon after the buckling.

In contrast, as for the frame model M3, the decreasing rate of the load immediately after the buckling was small compared to those of the frame models M1 and M2, a second load drop occurred later than in the frame model M2. Therefore, the frame model M3 was found to have a higher EA efficiency than the frame models M1 and M2.

Figure 12:
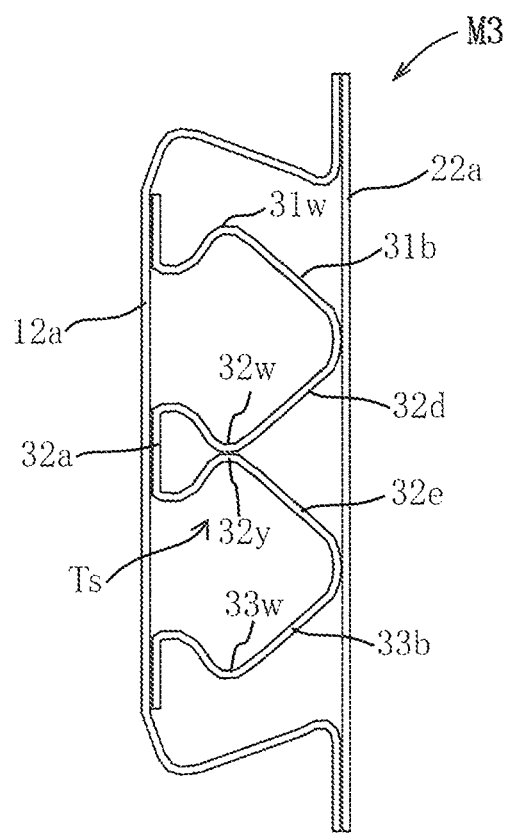
FIG. 12 is a front view of the frame model M3 in a buckled state.

This is because, in the reinforcing member 30A, the ridges 31w, 31x, 32w, 32x, 32y, 32e, 33w, 33x are formed in the partition wall portions 31b, 32d, 32e, 33b, which strengthens each of the partition wall portions 31b, 32d, 32e, 33b. In addition, in the frame model M3, the compression-side ridges 32w, 32y come into contact with each other in a deformation of the frame caused upon receipt of a compressive load on the compression-side wall portion, as shown in FIG. 12. Consequently, as shown by the reference character Ts in FIG. 12, a truss structure is formed in the main frame by the partition wall portions 32e, 32d. This prevents collapse of the main closed cross-section and the sub closed-cross sections. In other words, the partition wall portions 32d, 32e come into contact with each other at their respective intermediate parts to thereby form a truss structure in cooperation with the tension-side wall portion and the compression-side wall portion (second compression-side connection portion).

In this manner, the front side frame 2 including the reinforcing member 30A can have an increased EA efficiency owing to the reinforced partition wall portions 31b, 32d, 32e, 33b due to the ridges 31w, 31x, 32w, 32x, 32y, 32e, 33w, 33x formed in the reinforcing member 30A, and owing to the truss structures created in the deformation.

The decreasing rate of the load immediately after a buckling of the frame model 4 was smaller than that of the frame model M3. Therefore, the frame model M4 was found to have a higher EA efficiency than the frame model M3.

This is because, in the frame model M4, truss structures are formed in the main frame sooner than in the frame model M3.

Figure 13:
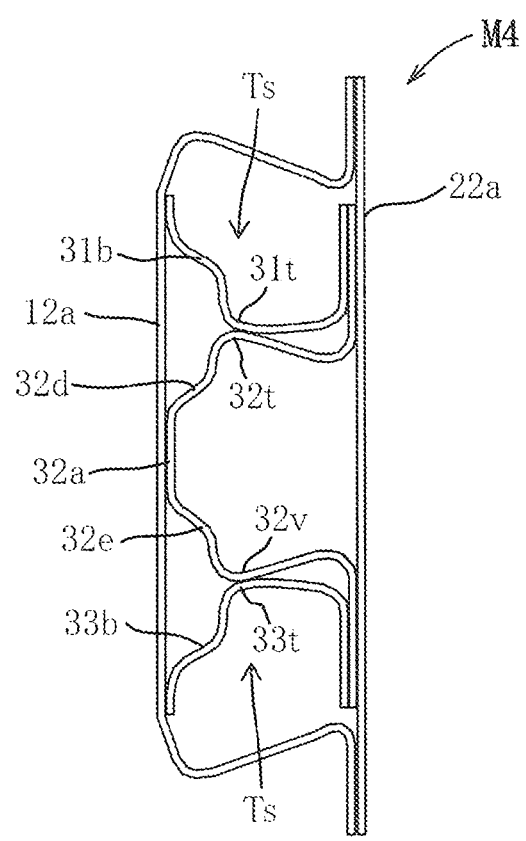
FIG. 13 is a front view of the frame model M4 in a buckled state.

Specifically, as described, in the reinforcing member 30 of the frame model M4, the vertical distance between the first tension-side ridge 31t and the second tension-side ridge 32t and the vertical distance between the third tension-side ridge 32v and the fourth tension-side ridge 33t are smaller than the vertical distance between the second compression-side ridge 32s and the third compression-side ridge 32u. Therefore, as shown in FIG. 13, soon after the buckling, the first tension-side ridge 31t comes into contact with the second tension-side ridge 32t and the third tension-side ridge 32v comes into contact with the fourth tension-side ridge 33t, so that truss structures Ts are created in the main frame.

Further, because such quick creation of the truss structures on the tension-side further prevents collapse of the main closed cross-section and the sub closed-cross sections, a second load drop after the buckling is suppressed.

As described, in the front side frame 2 to which the vehicular frame (vehicular frame including the reinforcing member 30) according to the present embodiment is applied, the first to third partition wall portions 31b, 32d, 32e are respectively formed with the first to third compression-side ridges 31s, 32s, 32u that extend in the front-rear direction and face each other, and the first to third tension-side ridges 31t, 32t, 32v that lie closer to the tension side than the first to third compression-side ridges 31s, 32s, 32u, the tension-side ridges 31t, 32t, 32v extending in the front-rear direction and facing each other. This makes it possible to strengthen the first to third partition wall portions 31b, 32d, 32e, and in turn, to prevent an out-of-plane deformation of the first to third partition wall portions 31b, 32d, 32e and increase the allowable critical load of the front side frame 2. In addition, the fourth partition wall portion 33b is also formed with the fourth compression-side ridge 33s and the fourth tension-side ridge 33t, which further increases the allowable critical load.

Further, because the truss structure Ts is created by the contact between the first and second tension-side ridges 31t, 32t after a buckling of the compression-side wall portion 11a, it is possible to prevent collapse of the cross section of the front side frame 2. Therefore, it is possible to prevent a load drop after the buckling and increase the EA efficiency. Similarly, the truss structure Ts is created by the contact between the fourth tension-side ridge 33t and the third tension-side ridge 32v. Therefore, it is possible to further prevent collapse of the cross section of the front side frame 2.

Here, a configuration for preventing collapse of the cross-section is considered in which respective intermediate parts of the partition wall portions are connected to each other by separately provided wall members in advance, for example. In this case, however, the structure would be complex. Further, because the partition wall portions have to be secured to the wall members by welding in the frame, the number of welding positions would increase, which would deteriorate the productivity. In contrast, in the present embodiment, the respective intermediate parts of the partition wall portions are configured to come into contact with each other in a deformation, instead of being connected to each other in advance. This makes it possible to simplify the structure and reduce the number of welding portions, so that collapse of the cross-section can be prevented while improving the productivity.

In particular, in the present embodiment, the first and second tension-side ridges 31t, 32t are disposed vertically between the first and second compression-side ridges 31s, 32s, and the second and third compression-side ridges 32s, 32u are disposed vertically between the second and third tension-side ridges 32t, 32v.

Therefore, it is possible to reliably cause the first and second tension-side ridges 31t, 32t to come into contact with each other to thereby create the truss structure in a deformation of the first and second partition wall portions 31b, 32d.

The vertical distance between the first and second tension-side ridges 31t, 32t is smaller than the vertical distance between the second and third compression-side ridges 32s, 32u.

This makes it possible to more reliably cause the contact between the first and second tension-side ridges 31t, 32t supported by the tension-side wall portion 22a to thereby create the truss structure, and in turn, to further improve the effect of preventing collapse of the cross-section.

Similarly, the vertical distance between the third and fourth tension-side ridges 32v, 33t is smaller than the vertical distance between the second and third compression-side ridges 32s, 32u. Therefore, it is possible to more reliably cause the contact between these tension-side ridges 32v, 33t to thereby create the truss structure, and in turn, to further improve the effect of preventing collapse of the cross-section.

The first partition wall portion 31b and the second partition wall portion 32d are configured as separate components, and the connection flange portion 32f extending upward from the upper end of the first tension-side connection portion 32b and the partition wall flange portion 31c extending upward from the tension-side end of the first partition wall portion 31b are connected to each other.

Therefore, it is possible to set the vertical distance between the first and second tension-side ridges 31t, 32t to any value.

Similarly, because the third partition wall portion 32e and the fourth partition wall portion 33b are configured as separate components, it is possible to set the vertical distance between the third and fourth tension-side ridges 32v, 33t to any value.

Further, in the present embodiment, the sub closed-cross section c has a height (vertical dimension) smaller than a width (lateral dimension), and thus has the length-to-width ratio of 1 or less. This makes it possible to increase the allowable critical load of the front side frame 2 and maintain it for a certain stroke.

A specific explanation is given below.

In order to study buckling of a frame having a vertically long rectangular shape in cross section, the present inventors performed an analysis of the mechanism of deformation of the frame, using the CAE (Computer Aided Engineering).

First, the basic idea of the analysis will be explained.

As shown in FIG. 14, there were prepared a frame model M made of a steel plate and having a longer dimension and a closed cross-section, and a load application means T configured to bend an axis of the frame model M in a state of clamping opposite ends of the frame model M. Using these components, a displacement of a load point P and a reaction force at the load point P were analyzed.

Figure 15A:
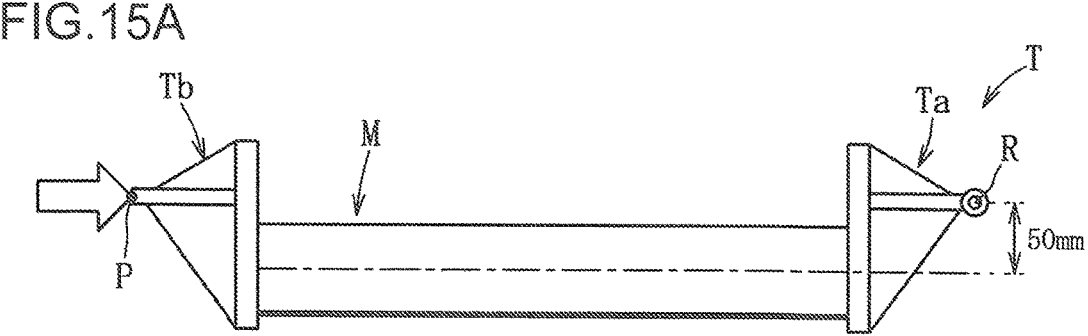
FIG. 15 illustrate deformations of the frame having the closed cross-section, FIG. 15A showing a state of the frame before receipt of a load and FIG. 15B showing a state of the frame after the receipt of the load.
Figure 15B:
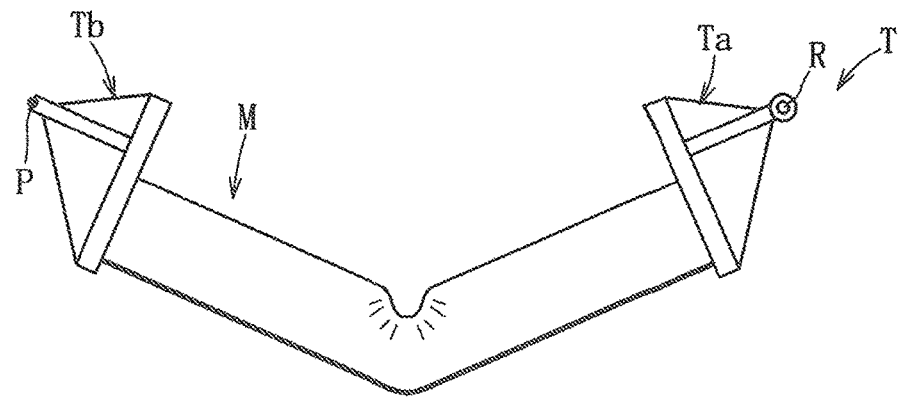

As shown in FIGS. 14, 15A and 15B, the load application means T includes a support section Ta pivotable about a pivot shaft R, and a support section Tb having the load point P at which a load is applied, the support section Tb being pivotable to move toward the support section Ta. The straight line connecting the pivot shaft R and the load point P is offset from the axis of the frame model M by 50 mm. Wall portions constituting the frame model M include a compression-side wall portion Ma on which a compressive load acts, a tension-side wall portion Mb on which a tensile load acts, and an upper end wall portion Mc and a lower end wall portion Md connecting respective upper ends of the wall portions Ma and Mb and respective lower ends of the wall portions Ma and Mb, respectively.

Now, an analysis result will be described.

Figure 16:
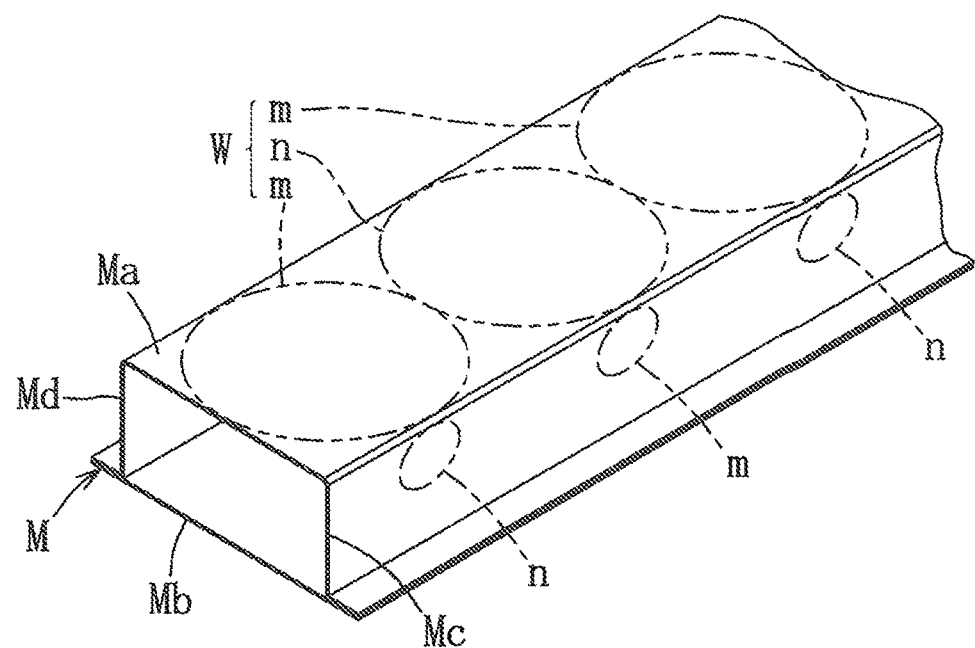
FIG. 16 is a diagram for explaining an elastic buckling of a frame having a closed cross-section.

As shown in FIG. 16, the mechanism to cause a buckling of a frame having a rectangular cross-section can be reasoned as follows.

Upon receipt of a load exceeding an allowable limit of elastic deformation, a surface deformation W occurs at an interval in the compression-side wall portion Ma. Each surface deformation W spreads to the upper end wall portion Mc and the lower end wall portion Md. Consequently, an out-of-plane deformation occurs in a bulge region n of each of the upper end wall portion Mc and the lower end wall portion Md, the bulge region n corresponding to a depression region m formed due to the surface deformation W in the compression-side wall portion Ma. This brings the frame into a fully buckled state with each of the upper end wall portion Mc and the lower end wall portion Md bulging out in an out-of-plane direction, and the compression-side wall portion Ma being folded in half.

Therefore, if the periodic surface deformations W are prevented from spreading to the upper end wall portion Mc and the lower end wall portion Md, it will be possible to increase the load that brings the frame into the fully buckled state. In other words, it will be possible to increase the amount of energy absorption before the full buckling, and in turn, to improve the EA efficiency.

In contrast, in the present embodiment, the lateral dimension of the sub closed-cross section c is greater than its vertical dimension. This makes it possible to prevent periodic surface deformations W from spreading to the upper end wall portion and the lower end wall portion. Accordingly, it is possible to increase the allowable limit load that causes a buckling of the front side frame and maintain it for a certain stroke.

Now, partial modifications of the above-described embodiment will be described.

[1] The above-described embodiment illustrates the case of the front side frame. However, the present invention can be applied to any vehicular frame on which a compressive load and a tensile load act, such as a rear side frame, a suspension cross member, a bumper beam, a center pillar, and an impact bar.

[2] In the above-described embodiment, 5000 series aluminum alloy is used as the material. However, the advantageous effects of the present invention can be achieved even when an ordinary steel plate or high tensile strength steel plate is used. Further, an aluminum alloy material may be selected from the 1000 series, 3000 series, 4000 series that are of non-heat-treated type, and the 2000 series, 6000 series, and 7000 series that are of heat-treated type, depending on design requirements.

[3] In the above-described embodiment, the case of including four partition wall portions is illustrated in the light of EA efficiency. However, the advantageous effects of the present invention can be achieved by including at least three partition wall portions. Further, five or more partition wall portions may be used for design purpose.

[4] In the above-described embodiment, the front side frame 2 includes the two outward bending deformation zones and the one inward bending deformation zone, and the reinforcing members provided in all of these deformation zones. Alternatively, a reinforcing member may be provided in at least one of the deformation zones of the front side frame 2. Further, the front side frame 2 may alternatively be made to include one outward bending deformation zone or one inward bending deformation zone.

[5] Persons skilled in the art may make other various modifications to the above-described embodiment without departing the spirit of the present invention, and the present invention includes such modifications.

The present invention is summarized as follows.

The present invention defines a vehicular frame, comprising: a main frame disposed in a front portion of a vehicle and extending in a front-rear direction; and a reinforcing member disposed inside the main frame and extending in the front-rear direction, the reinforcing member defining a plurality of closed cross sections in the main frame by dividing an internal space of the main frame in a vertical direction, wherein: the main frame has a main closed cross section having a substantially rectangular shape and includes, in sectional view, a compression-side wall portion extending in the vertical direction and configured to receive a compressive load in an impact of the vehicle, a tension-side wall portion extending in the vertical direction and facing the compression-side wall portion in a width direction of the vehicle, and configured to receive a tensile load in the impact of the vehicle, a top wall portion linking an upper end of the compression-side wall portion and an upper end of the tension-side wall portion, and a bottom wall portion linking a lower end of the compression-side wall portion and a lower end of the tension-side wall portion; the reinforcing member includes a first compression-side connection portion connected to the compression-side wall portion, a second compression-side connection portion disposed below the first compression-side connection portion and connected to the compression-side wall portion, a first tension-side connection portion disposed below the first compression-side connection portion and above the second compression-side connection portion and connected to the tension-side wall portion, a second tension-side connection portion disposed below the second compression-side connection portion and connected to the tension-side wall portion, a first partition wall portion linking a lower end of the first compression-side connection portion and an upper end of the first tension-side connection portion, a second partition wall portion linking a lower end of the first tension-side connection portion and an upper end of the second compression-side connection portion, and a third partition wall portion linking a lower end of the second compression-side connection portion and an upper end of the second tension-side connection portion; each of the first to third partition wall portions is bended at a plurality of positions between the compression-side wall portion and the tension-side wall portion, and has a compression-side ridge extending in the front-rear direction and a tension-side ridge disposed between the compression-side ridge and the tension-side wall portion and extending in the front-rear direction, the respective compression-side ridges of the first to third partition wall portions facing each other in the vertical direction and the respective tension-side ridges of the first to third partition wall portions facing each other in the vertical direction; and the compression-side ridges and the tension-side ridges are disposed at positions that allow, in a deformation of the partition wall portions, the compression-side ridge of the second partition wall portion to come into contact with the compression-side ridge of the third partition wall portion or the tension-side ridge of the first partition wall portion to come into contact with the tension-side ridge of the second partition wall portion.

According to this configuration, it is possible to strengthen the first to third partition wall portions by reinforcing them by the ridges, to thereby prevent an out-of-plane deformation of the first to third partition wall portions. Therefore, it is possible to increase the allowable critical load of the vehicular frame.

Furthermore, it is possible to form truss structures in the main frame by bringing the second and third compression-side ridges into contact with each other or the first and second tension-side ridges into contact with each other in a deformation of the vehicular frame, which makes it possible to prevent collapse of the cross-section of the vehicular frame. Consequently, it is possible to prevent a load drop after the buckling and, in turn, to increase the EA efficiency.

In addition, in this vehicular frame, the structure is simplified with a reduced number of welding positions, and the sub closed-cross section has a vertical dimension smaller than its lateral dimension (the length-to-width ratio being adjusted to be 1 or less, which makes it possible to increase the allowable critical load and maintain it for a certain stroke.

In the present invention, it is preferred that the tension-side ridge of the first partition wall portion and the tension-side ridge of the second partition wall portion are disposed below the compression-side ridge of the first partition wall portion and above the compression-side ridge of the second partition wall portion, respectively, and the compression-side ridge of the second partition wall portion and the compression-side ridge of the third partition wall portion are disposed below the tension-side ridge of the second partition wall portion and above the tension-side ridge of the third partition wall portion, respectively.

According to this configuration, it is possible to more reliably create the truss structures by more reliably bringing the second or third compression-side ridges into contact with each other and the first and second tension-side ridges into contact with each other.

Further, in the present invention, it is preferred that the vertical distance between the tension-side ridge of the first partition wall portion and the tension-side ridge of the second partition wall portion is smaller than the vertical distance between the compression-side ridge of the second partition wall portion and the compression-side ridge of the third partition wall portion.

According to this configuration, it is possible to create the truss structures in the main frame by bringing the first and second tension-side ridges lying close to the tension-side wall portion into contact with each other more quickly. Therefore, it is possible to more effectively suppress collapse of the cross section of the main frame.

Further, in the present invention, it is preferred that the first partition wall portion and the second partition wall portion are configured as separate components.

This configuration makes it possible to set the vertical distance between the first and second tension-side ridges to any value. In other words, it is possible to shorten the vertical distance between the first and second tension-side ridges to bring them into contact with each other more quickly.

Further, this configuration may further be made to comprise a connection flange portion extending upward from an upper end of the first tension-side connection portion; and a partition wall flange portion extending upward from one end of the first partition wall portion that is closer to the tension side wall portion than the other end in the vehicle width direction, wherein: the first partition wall portion and the partition wall flange portion are formed in one body; the second partition wall portion, the first tension-side connection portion, and the connection flange portion are formed in one body; and the connection flange portion and the partition wall flange portion are connected to each other.

According to this configuration, the first partition wall portion and the second partition wall portion are configured as separate components, and the connection flange portion and the partition wall flange portion are connected to each other, which makes it possible to easily secure these components to the main frame.

DESCRIPTION ON REFERENCE SIGNS

V: vehicle
C_m: main closed-cross section
c: sub closed-cross section
2: front side frame
11: first outer section
12a: compression-side wall portion
12b: upper end wall portion (top wall portion)
12c: lower end wall portion (bottom wall portion)
14b: upper end wall portion (top wall portion)
14c: lower end wall portion (bottom wall portion)
15b: upper end wall portion (top wall portion)
15c: lower end wall portion (bottom wall portion)
21: first inner section
22a: tension-side wall portion
30: reinforcing member
31a: first compression-side connection portion
31b: first partition wall portion
31c: partition wall flange portion
31s: first compression-side ridge
31t: first tension-side ridge
32a: second compression-side connection portion
32b: first tension-side connection portion
32c: second tension-side connection portion
32d: second partition wall portion
32e: third partition wall portion
32f: connection flange portion
32s: second compression-side ridge
32t: second tension-side ridge
32u: third compression-side ridge
32v: third tension-side ridge
201: main frame

The invention claimed is:
1. A vehicular frame, comprising:
a main frame disposed in a front portion of a vehicle and extending in a front-rear direction; and
a reinforcing member disposed inside the main frame and extending in the front-rear direction, the reinforcing member defining a plurality of closed cross sections in the main frame by dividing an internal space of the main frame in a vertical direction, wherein:
the main frame has a main closed cross section having a substantially rectangular shape and includes, in sectional view,
  a compression-side wall portion extending in the vertical direction and configured to receive a compressive load in an impact of the vehicle,
  a tension-side wall portion extending in the vertical direction and facing the compression-side wall portion in a width direction of the vehicle, and configured to receive a tensile load in the impact of the vehicle,
  a top wall portion linking an upper end of the compression-side wall portion and an upper end of the tension-side wall portion, and
  a bottom wall portion linking a lower end of the compression-side wall portion and a lower end of the tension-side wall portion;
the reinforcing member includes
  a first compression-side connection portion connected to the compression-side wall portion,
  a second compression-side connection portion disposed below the first compression-side connection portion and connected to the compression-side wall portion,
  a first tension-side connection portion disposed below the first compression-side connection portion and above the second compression-side connection portion and connected to the tension-side wall portion,
  a second tension-side connection portion disposed below the second compression-side connection portion and connected to the tension-side wall portion,
  a first partition wall portion linking a lower end of the first compression-side connection portion and an upper end of the first tension-side connection portion,
  a second partition wall portion linking a lower end of the first tension-side connection portion and an upper end of the second compression-side connection portion, and
  a third partition wall portion linking a lower end of the second compression-side connection portion and an upper end of the second tension-side connection portion;
each of the first to third partition wall portions is bended at a plurality of positions between the compression-side wall portion and the tension-side wall portion, and has a compression-side ridge extending in the front-rear direction and a tension-side ridge disposed between the compression-side ridge and the tension-side wall portion and extending in the front-rear direction, the respective compression-side ridges of the first to third partition wall portions facing each other in the vertical direction and the respective tension-side ridges of the first to third partition wall portions facing each other in the vertical direction; and the compression-side ridges and the tension-side ridges are disposed at positions that allow, in a deformation of the partition wall portions, the compression-side ridge of the second partition wall portion to come into contact with the compression-side ridge of the third partition wall portion or the tension-side ridge of the first partition wall portion to come into contact with the tension-side ridge of the second partition wall portion.

2. The vehicular frame according to claim 1, wherein the tension-side ridge of the first partition wall portion and the tension-side ridge of the second partition wall portion are disposed below the compression-side ridge of the first partition wall portion and above the compression-side ridge of the second partition wall portion, respectively, and
the compression-side ridge of the second partition wall portion and the compression-side ridge of the third partition wall portion are disposed below the tension-side ridge of the second partition wall portion and above the tension-side ridge of the third partition wall portion, respectively.

3. The vehicular frame according to claim 1, wherein the vertical distance between the tension-side ridge of the first partition wall portion and the tension-side ridge of the second partition wall portion is smaller than the vertical distance between the compression-side ridge of the second partition wall portion and the compression-side ridge of the third partition wall portion.

4. The vehicular frame according to claim 1, wherein the first partition wall portion and the second partition wall portion are configured as separate components.

5. The vehicular frame according to claim 4, further comprising:
a connection flange portion extending upward from an upper end of the first tension-side connection portion; and
a partition wall flange portion extending upward from one end of the first partition wall portion that is closer to the tension-side wall portion than the other end in the vehicle width direction, wherein:
the first partition wall portion and the partition wall flange portion are formed in one body;
the second partition wall portion, the first tension-side connection portion, and the connection flange portion are formed in one body; and
the connection flange portion and the partition wall flange portion are connected to each other.

6. The vehicular frame according to claim 2, wherein the vertical distance between the tension-side ridge of the first partition wall portion and the tension-side ridge of the second partition wall portion is smaller than the vertical distance between the compression-side ridge of the second partition wall portion and the compression-side ridge of the third partition wall portion.

7. The vehicular frame according to claim 6, wherein the first partition wall portion and the second partition wall portion are configured as separate components.

8. The vehicular frame according to claim 7, further comprising:
a connection flange portion extending upward from an upper end of the first tension-side connection portion; and
a partition wall flange portion extending upward from one end of the first partition wall portion that is closer to the tension-side wall portion than the other end in the vehicle width direction, wherein:
the first partition wall portion and the partition wall flange portion are formed in one body;
the second partition wall portion, the first tension-side connection portion, and the connection flange portion are formed in one body; and
the connection flange portion and the partition wall flange portion are connected to each other.

9. The vehicular frame according to claim 2, wherein the first partition wall portion and the second partition wall portion are configured as separate components.

10. The vehicular frame according to claim 9, further comprising:
a connection flange portion extending upward from an upper end of the first tension-side connection portion; and
a partition wall flange portion extending upward from one end of the first partition wall portion that is closer to the tension-side wall portion than the other end in the vehicle width direction, wherein:
the first partition wall portion and the partition wall flange portion are formed in one body;
the second partition wall portion, the first tension-side connection portion, and the connection flange portion are formed in one body; and
the connection flange portion and the partition wall flange portion are connected to each other.

11. The vehicular frame according to claim 3, wherein the first partition wall portion and the second partition wall portion are configured as separate components.

12. The vehicular frame according to claim 11, further comprising:
a connection flange portion extending upward from an upper end of the first tension-side connection portion; and
a partition wall flange portion extending upward from one end of the first partition wall portion that is closer to the tension-side wall portion than the other end in the vehicle width direction, wherein:
the first partition wall portion and the partition wall flange portion are formed in one body;
the second partition wall portion, the first tension-side connection portion, and the connection flange portion are formed in one body; and
the connection flange portion and the partition wall flange portion are connected to each other.

13. A vehicular frame, comprising:
a main frame disposed in a front portion of a vehicle and extending in a front-rear direction; and
a reinforcing member disposed inside the main frame and extending in the front-rear direction, the reinforcing member defining a plurality of closed cross sections in the main frame by dividing an internal space of the main frame in a vertical direction, wherein:
the main frame has a main closed cross section having a substantially rectangular shape and includes, in sectional view,
a compression-side wall portion extending in the vertical direction and configured to receive a compressive load in an impact of the vehicle,
a tension-side wall portion extending in the vertical direction and facing the compression-side wall portion in a width direction of the vehicle, and configured to receive a tensile load in the impact of the vehicle,
a top wall portion linking an upper end of the compression-side wall portion and an upper end of the tension-side wall portion, and a bottom wall portion linking a lower end of the compression-side wall portion and a lower end of the tension-side wall portion;

the reinforcing member includes
- a first compression-side connection portion connected to the compression-side wall portion,
- a second compression-side connection portion disposed below the first compression-side connection portion and connected to the compression-side wall portion,
- a first tension-side connection portion disposed below the first compression-side connection portion and above the second compression-side connection portion and connected to the tension-side wall portion,
- a second tension-side connection portion disposed below the second compression-side connection portion and connected to the tension-side wall portion,
- a first partition wall portion linking a lower end of the first compression-side connection portion and an upper end of the first tension-side connection portion,
- a second partition wall portion linking a lower end of the first tension-side connection portion and an upper end of the second compression-side connection portion and being configured as separate components from the first partition wall portion,
- a third partition wall portion linking a lower end of the second compression-side connection portion and an upper end of the second tension-side connection portion,
- a connection flange portion being formed together with the second partition wall portion and the first tension-side connection portion in one body and extending upward from an upper end of the first tension-side connection portion; and
- a partition wall flange portion being formed together with the first partition wall portion in one body and extending upward from one end of the first partition wall portion that is closer to the tension-side wall portion than the other end in the vehicle width direction;

each of the first to third partition wall portions is bended at a plurality of positions between the compression-side wall portion and the tension-side wall portion, and has a compression-side ridge extending in the front-rear direction and a tension-side ridge disposed between the compression-side ridge and the tension-side wall portion and extending in the front-rear direction, the respective compression-side ridges of the first to third partition wall portions facing each other in the vertical direction and the respective tension-side ridges of the first to third partition wall portions facing each other in the vertical direction;

the compression-side ridges and the tension-side ridges are disposed at positions that allow, in a deformation of the partition wall portions, the compression-side ridge of the second partition wall portion to come into contact with the compression-side ridge of the third partition wall portion or the tension-side ridge of the first partition wall portion to come into contact with the tension-side ridge of the second partition wall portion;

the tension-side ridge of the first partition wall portion and the tension-side ridge of the second partition wall portion are disposed below the compression-side ridge of the first partition wall portion and above the compression-side ridge of the second partition wall portion, respectively;

the compression-side ridge of the second partition wall portion and the compression-side ridge of the third partition wall portion are disposed below the tension-side ridge of the second partition wall portion and above the tension-side ridge of the third partition wall portion, respectively;

the vertical distance between the tension-side ridge of the first partition wall portion and the tension-side ridge of the second partition wall portion is smaller than the vertical distance between the compression-side ridge of the second partition wall portion and the compression-side ridge of the third partition wall portion; and the connection flange portion and the partition wall flange portion are connected to each other.

* * * * *